(12) United States Patent
Tuan et al.

(10) Patent No.: US 8,808,444 B2
(45) Date of Patent: Aug. 19, 2014

(54) FUNCTIONALIZED SOYBEAN COMPOUND, AND COATING COMPOSITION EMPLOYING THE SAME

(75) Inventors: Chi-Shen Tuan, Zhubei (TW);
Chun-Yao Ou, Hsinchu (TW);
Shinn-Jen Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 136 days.

(21) Appl. No.: 13/451,629

(22) Filed: Apr. 20, 2012

(65) Prior Publication Data

US 2013/0139726 A1 Jun. 6, 2013

(30) Foreign Application Priority Data

Dec. 1, 2011 (TW) .............................. 100144119 A

(51) Int. Cl.
*C08L 91/00* (2006.01)
*C09D 4/00* (2006.01)
*C09D 101/00* (2006.01)
*C09D 201/00* (2006.01)

(52) U.S. Cl.
USPC ........................... 106/266; 106/244; 106/243

(58) Field of Classification Search
USPC ......................... 106/266, 244, 243
See application file for complete search history.

(56) References Cited

U.S. PATENT DOCUMENTS

| | | | | |
|---|---|---|---|---|
| 4,220,569 A | * | 9/1980 | Borden et al. | ........... 524/359 |
| 4,224,369 A | * | 9/1980 | Borden et al. | ........... 428/203 |
| 4,233,130 A | * | 11/1980 | Borden et al. | ........... 522/10 |
| 4,278,580 A | | 7/1981 | Schmolzer et al. | |
| 6,570,029 B2 | | 5/2003 | Wang et al. | |
| 6,936,664 B2 | | 8/2005 | Woods et al. | |
| 7,405,247 B2 | | 7/2008 | Sachdev et al. | |
| 7,776,993 B2 | | 8/2010 | Buchwalter et al. | |
| 2005/0203246 A1 | * | 9/2005 | Thames et al. | ........... 524/785 |
| 2006/0211795 A1 | * | 9/2006 | Thames et al. | ........... 524/109 |
| 2008/0058438 A1 | | 3/2008 | Kuczynski | |
| 2009/0209441 A1 | * | 8/2009 | Lange et al. | ........... 508/239 |
| 2010/0196674 A1 | | 8/2010 | Vanderlip et al. | |

FOREIGN PATENT DOCUMENTS

| | | |
|---|---|---|
| CN | 101619179 A | 1/2010 |
| CN | 101705044 A | 5/2010 |
| CN | 102199272 A | 9/2011 |
| JP | 4-280224 A | 10/1992 |

OTHER PUBLICATIONS

Chen et al., "Soy-based, high biorenewable content UV curable coatings", Progress in Organic Coatings 71, pp. 98-109, (2011).
Fu et al., "Thermal and Mechanical Properties of Acrylated Expoxidized-Soybean Oil-Based Thermosets", Journal of Applied Polymer Science, vol. 117, pp. 2220-2225, (2010).
Pelletier et al., "Acrylated Vegetable Oils as Photocrosslinkable Materials", Journal of Applied Polymer Science, vol. 99, pp. 3218-3221, (2006).
Xing et al., "Water based UV curable epoxy-acrylate coating", Painting Material Industry, vol. 5, pp. 18-19, 2000.
Zhu, "Study on Synthesis of Alkali Soluble Photosensitive Resin", Fine and Specialty Chemicals, vol. 13, No. 21, pp. 17-20, Nov. 6, 2005.
Meier, M. A. et al, "Plant oil renewable resources as green alternatives in polymer science," Chem. Soc. Rev., 2007, vol. 36, pp. 1788-1802.
Taiwan Office Action for Appl. No. 100144119 dated Jan. 7, 2014.

* cited by examiner

*Primary Examiner* — James McDonough
(74) *Attorney, Agent, or Firm* — Birch, Stewart, Kolasch & Birch, LLP

(57) ABSTRACT

The disclosure provides a functionalized soybean compound, and a coating composition employing the same. The functionalized soybean compound has the chemical structure represented below:

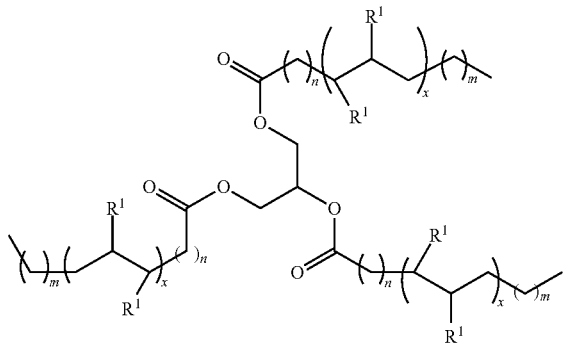

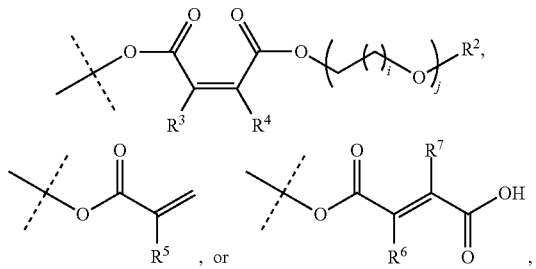

wherein, each n is independent and an integer from 1 to 10; each m is independent and an integer from 1 to 10; each x is independent and can be 1 or 2; and each $R^1$ is independent and can be hydroxyl group, wherein i can be 1, or 2, j can be an integer from 4 to 60, $R^2$ can be hydrogen, $C_{1-3}$ alkyl group, or acrylic group, $R^3$ and $R^4$ are hydrogen, or $R^3$ and $R^4$ are linked together with the carbon atoms to which $R^3$ and $R^4$ are attached to form a saturated and unsaturated six-membered ring, and $R^6$, $R^7$, and $R^8$ are independent and can be hydrogen, or $C_{1-6}$ alkyl group.

23 Claims, 1 Drawing Sheet

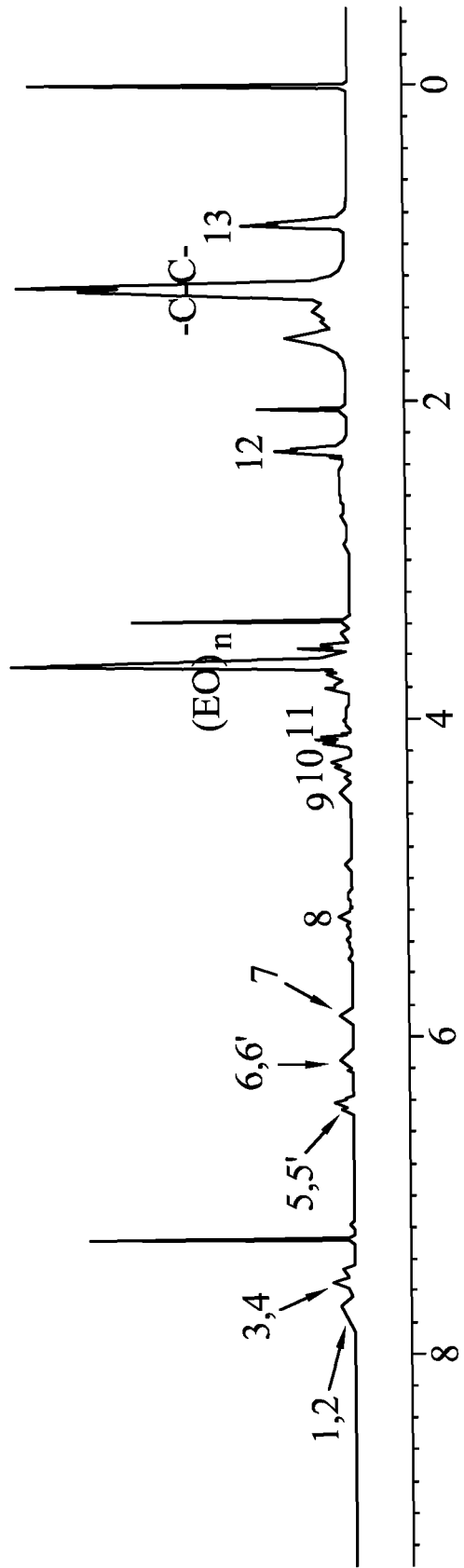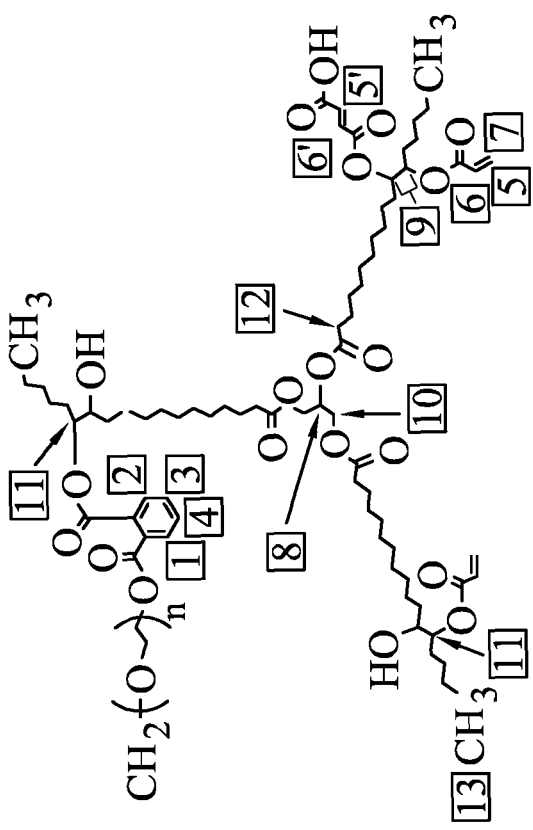

FUNCTIONALIZED SOYBEAN COMPOUND, AND COATING COMPOSITION EMPLOYING THE SAME

CROSS REFERENCE TO RELATED APPLICATIONS

This application is based upon and claims the benefit of priority from the prior Taiwan Patent Application No. 100144119, filed on Dec. 1, 2011, the entire contents of which are incorporated herein by reference.

BACKGROUND

1. Technical Field

The disclosure relates to a functionalized soybean compound and a coating composition employing the same, and in particular relates to an environmentally-friendly functionalized soybean compound and a coating composition employing the same.

2. Related Art

With economic development, various paints requirements have markedly increased. Solvent-based inks, having the advantages of high adhesion and being easily removed from a substrate, are widely used in different industries. However, solvent-based inks have a problem of environmental pollution (solvent volatilization) and require high power consumption for drying. The deficiencies associated with solvent-based systems have led to the development of photo-curable ink systems, for example inks curable by UV-energy, which require less or no solvent and meet the requirement of environmental friendliness.

However, existing UV-curable inks are not wholly satisfactory, particularly in term of adhesion to a carrier substrate due to a high curing speed. In order to solve this problem, a UV-curable ink with high adhesion to the carrier substrate has been provided, but it is very difficult to remove the ink from the carrier substrate. Thus, the carrier substrate cannot be made recyclable. Therefore, manufacturing cost is increased and the environmental pollution is aggravated. Further, in general, the UV-curable ink includes non-biodegradable polymeric material and is not environmentally-friendly.

Therefore, it is necessary to develop novel environmentally-friendly UV-curable inks to solve the above problems.

SUMMARY

An exemplary embodiment of functionalized soybean compound has a chemical structure represented by Formula (I):

Formula (I)

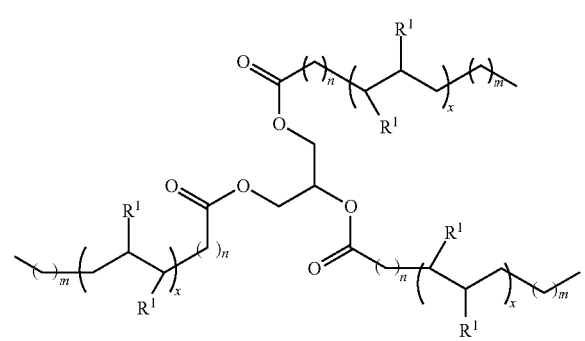

wherein each n is independent and an integer from 1 to 10; each m is independent and an integer from 1 to 10; each x is independent and is 1 or 2; and each $R^1$ is independent hydroxyl group,

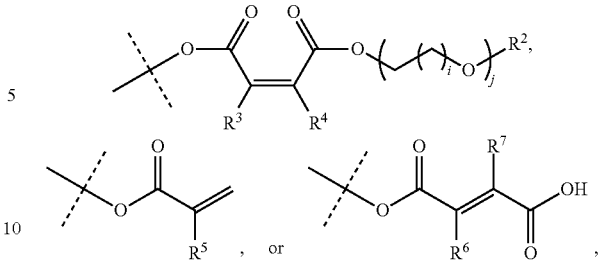

wherein i is 1, or 2; j is an integer from 4 to 60; $R^2$ is hydrogen, $C_{1-3}$ alkyl group, or acrylate group; $R^3$ and $R^4$ are hydrogen, or $R^3$ and $R^4$ are linked together with the carbon atoms to which $R^3$ and $R^4$ are attached to form a saturated and unsaturated six-membered ring; and $R^5$, $R^6$, and $R^7$ are independent hydrogen, or $C_{1-6}$ alkyl group. Particularly, only one $R^1$ of Formula (I) is

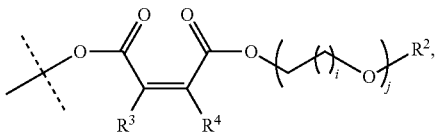

at least one $R^1$ of Formula (I) is

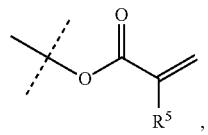

and at least one $R^1$ of Formula (I) is

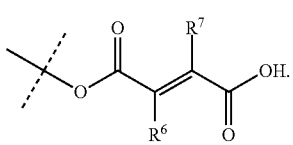

In another exemplary embodiment of the disclosure, a coating composition is provided. The coating composition can include a photo-initiator, and the aforementioned functionalized soybean oil compound having Formula (I). Further, according to embodiments of the disclosure, the coating composition can include a photo-initiator; an acrylic monomer; an inorganic oxide particle; and, the aforementioned functionalized soybean oil compound having Formula (I). The coating composition of the disclosure can be used to form a film via planographic printing, screen printing, coating, and spraying, and the film fabricated from the coating composition can serve as normal paint, flat paint, anti-glare paint, diffusion film material, or lightguide plate ink.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows a $^1$H-NMR spectrogram of the functionalized soybean compound (I) of Example 1.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Exemplary embodiment of the disclosure provides a functionalized soybean compound, and a coating composition including the functionalized soybean compound. The functionalized soybean compound has a Formula (I) of:

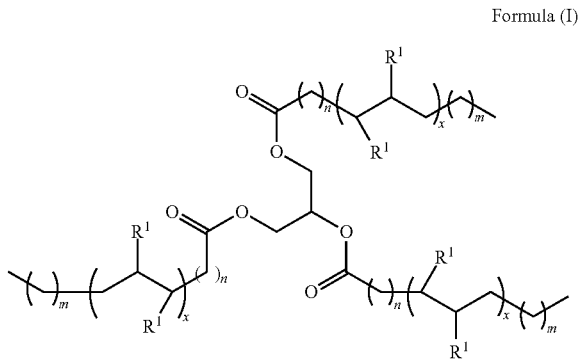

Formula (I)

wherein, each n is independent and an integer from 1 to 10; each m is independent and an integer from 1 to 10; each x is independent and is 1 or 2; and each $R^1$ is independent and is hydroxyl group

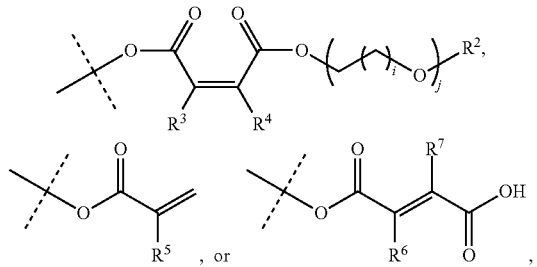

wherein i is 1, or 2; j is an integer from 4 to 60; $R^2$ is hydrogen, $C_{1-3}$ alkyl group, or acrylate group; $R^3$ and $R^4$ are hydrogen, or $R^3$ and $R^4$ are linked together with the carbon atoms to which $R^3$ and $R^4$ are attached to form a saturated and unsaturated six-membered ring; and $R^5$, $R^6$, and $R^7$ are independent hydrogen, or $C_{1-6}$ alkyl group.

It should be noted, in order to increase the adhesion between the functionalized soybean compound and a substrate, one R1 of the Formula (I) should be

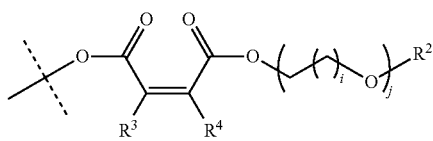

(wherein i is 1, or 2; j is an integer from 4 to 60; $R^2$ is hydrogen, $C_{1-3}$ alkyl group, or acrylate group; $R^3$ and $R^4$ is hydrogen, or $R^3$ and $R^4$ are linked together with the carbon atoms to which $R^3$ and $R^4$ are attached to form a saturated and unsaturated six-membered ring). Further, in order to force the Functionalized soybean compound to be photo-polymerizable, at least one $R^1$ of the Formula (I) should be

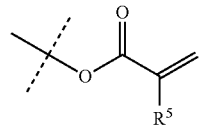

($R^5$ is hydrogen, or $C_{1-6}$ alkyl group). Moreover, in order to force the functionalized soybean compound to be removable by washing with alkaline solution (such as 5 wt % NaOH aqueous solution), at least one $R^1$ of the Formula (I) should be

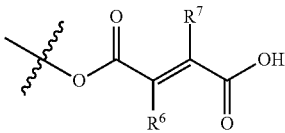

($R^6$ and $R^7$ is hydrogen, or $C_{1-6}$ alkyl group).

According to an embodiment of the disclosure, in order to improve the photo-polymerizability of the functionalized soybean compound, only one $R^1$ of Formula (I) is

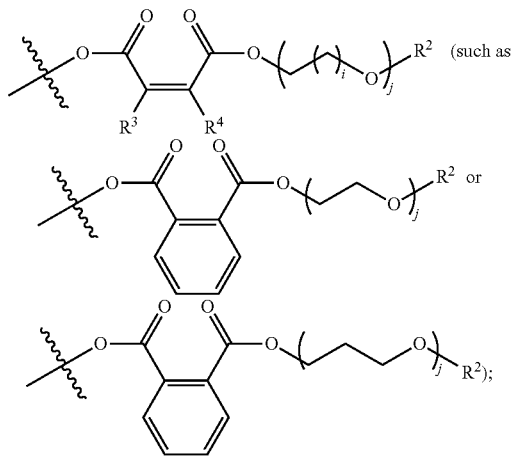

at least one $R^1$ is

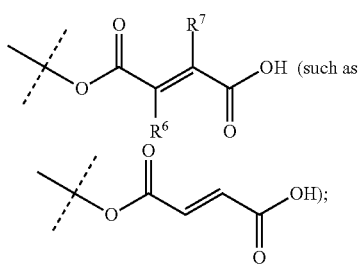

and the other $R^1$ are

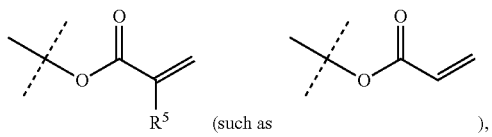

wherein i is 1, or 2; j is an integer from 4 to 60; $R^2$ is hydrogen, $C_{1-3}$ alkyl group, or acrylate group; $R^3$ and $R^4$ is hydrogen, or $R^3$ and $R^4$ are linked together with the carbon atoms to which $R^3$ and $R^4$ are attached to form a saturated and unsaturated six-membered ring (such as phenyl, or pyridyl); and $R^5$, $R^6$, and $R^7$ are independent and can be hydrogen, or $C_{1-6}$ alkyl group (such as: methyl, ethyl, propyl, isopropyl, butyl, isobutyl, pentyl, or hexyl). Since the functionalized soybean compound is prepared by modifying the soybean oil, the functionalized soybean compound of the disclosure is also biodegradable and highly environmentally friendly.

An Embodiment of the disclosure also provides a coating composition, including a photo-initiator, and the functionalized soybean compound having Formula (I). The photo-initiator can produce active species capable of initiating the polymerization of the polyfunctional monomer, such as radical, cationic and anionic species, when irradiated with radiation such as visible light, ultraviolet (UV) light, far ultraviolet light, electron beam or X-ray. Preferred examples of the photoinitiators include acetophenone compounds, benzoin compounds, benzophenone compounds, thioxanthone compounds, and anthraquinone compounds. The photo-initiator has a weight percentage of between 2-10 wt %, based on the weight of the functionalized soybean compound.

Due to the functionalized soybean compound having Formula (I), the coating composition exhibits high viscosity and is suitable for forming as a film on a substrate via planographic printing, or screen printing. Further, the coating composition can further include an acrylic monomer (such as a monomer including at least two terminal acrylic functional groups) for forming a film on a substrate via spin-coating, or spraying. The acrylic monomer can have a weight percentage of between 0.01-30 wt %, based on the weight of the functionalized soybean compound.

According to an embodiment of the disclosure, the coating composition can further include a colorant (such as dye or pigment), and thus the coating composition can serve as a normal painting. Particularly, the colorant has a weight percentage of between 0.01-100 wt %, based on the weight of the functionalized soybean compound.

The coating composition can further include a functionalized soybean compound having Formula (II), of:

Formula (II)

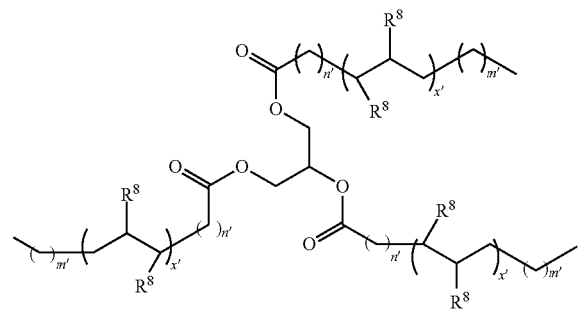

wherein, each n' is independent and an integer from 1 to 10; each m' is independent and an integer from 1 to 10; each x' is independent and is 1 or 2; and each $R^8$ is independent hydroxyl group,

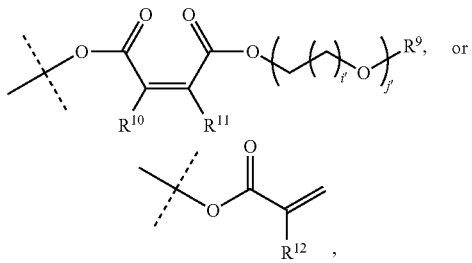

wherein i' is 1, or 2; j' is an integer from 4 to 60; $R^9$ is hydrogen, $C_{1-3}$ alkyl group, or acrylate group; $R^{10}$ and $R^{11}$ are hydrogen, or $R^{10}$ and $R^{11}$ are linked together with the carbon atoms to which $R^{10}$ and $R^{11}$ are attached to form a saturated and unsaturated six-membered ring; and $R^{12}$ is independent hydrogen, or $C_{1-6}$ alkyl group.

Due to the functionalized soybean compound having Formula (II), the film formed from the coating composition is apt to be insoluble in water, and can be removable by washing with alkaline solution (such as 5 wt % NaOH aqueous solution), resulting in the substrate, which is coated with the composition, being reusable.

Since the functionalized soybean compound having Formula (II) does not have any carboxylic group, the molar ratio of the carboxylic group among the functionalized soybean compounds having Formula (I) and Formula (II) can be reduced to be between 0.1-0.5 (or between 0.1-0.2) by means of the addition of the functionalized soybean compound having Formula (II), resulting in that a film formed from the composition can be insoluble in water, and can be removable by washing with alkaline solution.

According to an embodiment of the disclosure, during the preparation of functionalized soybean compound having Formula (I), the final product would include the functionalized soybean compounds having Formula (I) and (II), if the equivalent of maleic anhydride is reduced to be 0.1-0.5 (based on that the equivalent of soybean is 1) in the step for adding maleic anhydride. Further, the above final product including the mixture of the functionalized soybean compounds having Formula (I) and (II) can have a molar ratio of the carboxylic group among the functionalized soybean compounds of between 0.1-0.5. According to some embodiments of the disclosure, the coating composition of the disclosure can serve as flat paint, anti-glare paint, diffusion film material, or lightguide plate ink.

According to other embodiments of the disclosure, the coating composition can include a photo-initiator, an inorganic oxide particle, and the functionalized soybean compound having Formula (I). The photo-initiator has a weight percentage of between 2-10 wt %, and the inorganic oxide particle has a weight percentage of between 2-40 wt %, based on the weight of the functionalized soybean compound. The inorganic oxide particle can include titanium dioxide, or silicon dioxide, and the inorganic oxide particle can have a particular size of between 0.01-1.0 μm. Moreover, the coating composition can further include an acrylic monomer, wherein the acrylic monomer has a weight percentage of between 0.01-30 wt %.

The following examples are intended to illustrate the disclosure more fully without limiting the scope, since numerous modifications and variations will be apparent to those skilled in this art.

Preparation of Functionalized Soybean Compound

Example 1

First, 75.0 g (0.1 mole) of PE0750 (poly(ethylene oxide, with a molecular weight of 750, manufactured by OUCC), and 14.8 g (0.1 mole) phthalic anhydride (manufactured by Aldrich) were added into a 250 ml reaction bottle. Next, 1.83 g (2 wt %) of biphenyl phosphine (manufactured by Aldrich) serving as a catalyst was added into the reaction bottle, and the mixture was stirred under 95±3° C. for 2 hr. Next, 100 g (0.1 mole) of epoxidized soybean oil (manufactured by Chang Chun Plastics Co., LTD) and 0.05 g (0.4 mmole) of p-hydroxyanisole (manufactured by Aldrich) serving as retarder were added into the reaction bottle. After reacting at 95±3° C. for 4 hr, 14.4 g (0.2 mole) of acrylic acid (manufactured by Aldrich) was added into the reaction bottle. After reacting at 95±3° C. for 6 hr, 9.8 g (0.1 mole) of maleic anhydride (manufactured by Aldrich) was added into the reaction bottle, wherein the ratio between the maleic anhydride and the soybean oil was 1:1. After reacting for 2 hr and purification, a functionalized soybean compound (I) was obtained. The synthesis pathway was as follows:

Functionalized Soybean Compound (I)

Then, the functionalized soybean compound (I) was measured by an NMR (nuclear magnetic resonance) Spectrometer, and an NMR spectrogram thereof was shown as FIG. 1. Further, the molecular weight was measured by a gel permeation chromatography (GPC), and the results were as follows: Mn (number Average Molecular Weigh): 2800, Mw (weight Average Molecular Weight): 3800, and Mp (GPC-average molecular weigh): 3100.

Examples 2-10

Examples 2-10 were performed as the method for preparing the functionalized soybean compound (I) as described in Example 1 except that the molar ratio of between the maleic anhydride and epoxidized soybean oil were respectively replaced by 0.05, 0.1, 0.2, 0.3, 0.4, 0.5, 0.6, 0.7, and 0.8, obtaining the functionalized soybean mixture (I)-(XI) respectively. Since the molar ratio between the maleic anhydride and epoxidized soybean oil used in Examples 2-10 were less than 1, the functionalized soybean mixture (I)-(XI) included not only the functionalized soybean compound (I) as disclosed in Example 1 but also the functionalized soybean compound (II), of:

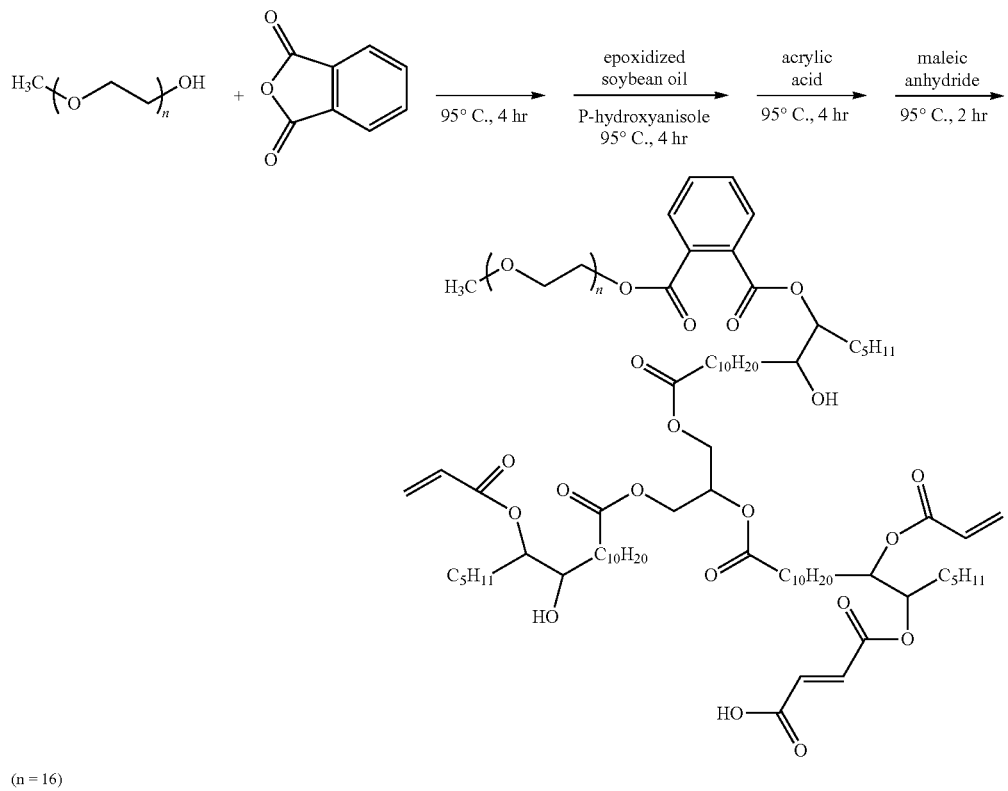

(n = 16)

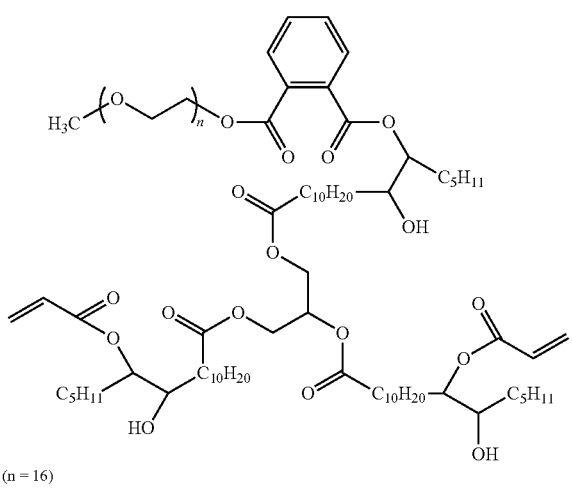

(n = 16)

Preparation of Coating Composition and the Characteristics Thereof

Example 11-14

In Examples 11-14, the functionalized soybean mixture (I)-(IV) were respectively mixed with 0.15 g of photo-initiator (manufactured and sold by Eternal Chemical Co, Ltd, with a trade no. PI1173), obtaining coating compositions (I)-(IV). Next, the coating compositions (I)-(IV) were blade coated respectively on an acrylic substrate, and pre-baked at 100° C. for 5 min. After exposure to UV irradiation (365 nm, 1150 mJ/cm$^2$), the obtained films were subjected to dissolution, adhesion, hardness, and transmittance tests, and the results are shown in Table 1.

(Remark: The adhesion properties of the coatings on Examples 11-14 were evaluated using an adhesion test. An adhesive tape was applied and rapidly removed from the film. To the extent in which the adhesive was separated from the film and remained on the substrate, an advantageous adhesion was indicated. A preferred tape for such a test is Scotch 600-brand office tape by 3M, St. Paul, Minn.)

As shown in Table 1, when the coating compositions had an equivalent of carboxylic group of between 0.1-0.2, the films prepared by the coating compositions had a high adhesion and hardness, and can be insoluble in water and removable by washing with alkaline solution.

Examples 15-21

In Examples 15-21, the functionalized soybean mixture (III)-(XI) were respectively mixed with 0.15 g of photo-initiator (manufactured and sold by Eternal Chemical Co, Ltd, with a trade no. PI1173), 0.325 g of acrylic monomer (pentaerythritol triacrylate, manufactured and sold by Eternal Chemical Co, Ltd, with a trade no. EM235), and 1 ml of ethanol, obtaining coating compositions (V)-(XI). Next, the coating compositions (V)-(XI) were blade coated respectively on an acrylic substrate, pre-baked at 100° C. for 5 min, and exposed by UV irradiation (365 nm, 1150 mJ/cm$^2$).

TABLE 1

|  | Example | | | |
| --- | --- | --- | --- | --- |
|  | 11 functionalized soybean mixture (I) (2.04 g, 1 eq) | 12 functionalized soybean mixture (II) (2.04 g, 1 eq) | 13 functionalized soybean mixture (III) (2.04 g, 1 eq) | 14 functionalized soybean mixture (IV) (2.04 g, 1 eq) |
| equivalent of carboxylic group | 0.05 eq | 0.1 eq | 0.2 eq | 0.3 eq |
| photo-initiator PI1173 | 0.15 g | 0.15 g | 0.15 g | 0.15 g |
| water-soluble | no | no | no | yes |
| alkali-soluble (5 wt % NaOH aqueous solution) | no | yes | yes | yes |
| adhesion test | non-pass | pass | pass | pass |
| pencil hardness | 5B | 5B | 5B | 5B |
| transmittance (film thickness of about 20 μm) | 89% | 89% | 89% | 88% |

TABLE 2

| | Example | | | |
|---|---|---|---|---|
| | 15 Functionalized soybean mixture 3 (2.04 g, 1 eq) | 16 Functionalized soybean mixture 4 (2.04 g, 1 eq) | 17 Functionalized soybean mixture 5 (2.04 g, 1 eq) | 18 Functionalized soybean mixture 6 (2.04 g, 1 eq) |
| equivalent of carboxylic group | 0.2 eq | 0.3 eq | 0.4 eq | 0.5 eq |
| photo-initiator PI1173 | 0.15 g | 0.15 g | 0.15 g | 0.15 g |
| acrylic monomer | 0.325 g (1 eq) | 0.325 g (1 eq) | 0.325 g (1 eq) | 0.325 g (1 eq) |
| ethanol | 1 ml | 1 ml | 1 ml | 1 ml |
| water-soluble | no | no | no | no |
| alkali-soluble (5 wt % NaOH aqueous solution) | no | yes | yes | yes |

| | Example | | |
|---|---|---|---|
| | 19 Functionalized soybean mixture 7 (2.04 g, 1 eq) | 20 Functionalized soybean mixture 8 (2.04 g, 1 eq) | 21 Functionalized soybean mixture 9 (2.04 g, 1 eq) |
| equivalent of carboxylic group | 0.6 eq | 0.7 eq | 0.8 eq |
| photo-initiator PI1173 | 0.15 g | 0.15 g | 0.15 g |
| acrylic monomer | 0.325 g (1 eq) | 0.325 g (1 eq) | 0.325 g (1 eq) |
| ethanol | 1 ml | 1 ml | 1 ml |
| water-soluble | yes | yes | yes |
| alkali-soluble (5 wt % NaOH aqueous solution) | yes | yes | yes |

As shown in Table 2, when the coating compositions further included an acrylic monomer and have an equivalent of carboxylic group of between 0.3-0.5, the films prepared by the coating compositions can be insoluble in water and removable by washing with alkaline solution.

Example 22

2.04 g of functionalized soybean mixture (IV), 0.12 g silicon dioxide (with a particle size of 20 nm), 0.15 g of photo-initiator (manufactured and sold by Eternal Chemical Co, Ltd, with a trade no. PI1173), 0.325 g of acrylic monomer (pentaerythritol triacrylate, manufactured and sold by Eternal Chemical Co, Ltd, with a trade no. EM235), and 1 ml of ethanol were mixed, obtaining the coating composition (XII). Next, the coating composition (XII) was blade coated on an acrylic substrate, and pre-baked at 100° C. for 5 min. After exposing to UV irradiation (365 nm, 1150 mJ/cm$^2$), the obtained film was subjected to transmittance, glossiness, and haze tests, and the results are shown in Table 3.

Example 23

2.04 g of functionalized soybean mixture (IV), 0.24 g silicon dioxide (with a particle size of 20 nm), 0.15 g of photo-initiator (manufactured and sold by Eternal Chemical Co, Ltd, with a trade no. PI1173), 0.325 g of acrylic monomer (pentaerythritol triacrylate, manufactured and sold by Eternal Chemical Co, Ltd, with a trade no. EM235), and 1 ml of ethanol were mixed, obtaining the coating composition (XIII). Next, the coating composition (XIII) was blade coated on an acrylic substrate, and pre-baked at 100° C. for 5 min. After exposing to UV irradiation (365 nm, 1150 mJ/cm$^2$), the obtained film was subjected to transmittance, glossiness, and haze tests, and the results are shown in Table 3.

Example 24

2.04 g of functionalized soybean mixture (IV), 0.12 g titanium dioxide (with a particle size of 0.3 µm), 0.15 g of photo-initiator (manufactured and sold by Eternal Chemical Co, Ltd, with a trade no. PI1173), 0.325 g of acrylic monomer (pentaerythritol triacrylate, manufactured and sold by Eternal Chemical Co, Ltd, with a trade no. EM235), and 1 ml of ethanol were mixed, obtaining the coating composition (XIV). Next, the coating composition (XIV) was blade coated on an acrylic substrate, and pre-baked at 100° C. for 5 min. After exposing to UV irradiation (365 nm, 1150 mJ/cm2), the obtained film was subjected to transmittance, glossiness, and haze tests, and the results are shown in Table 3.

TABLE 3

| | Example | | |
|---|---|---|---|
| | 22 Functionalized soybean mixture (IV) 2.04 g (1 eq) | 23 Functionalized soybean mixture 2.04 g (IV) (1 eq) | 24 Functionalized soybean mixture 2.04 g (IV) (1 eq) |
| equivalent of carboxylic group | 0.3 eq | 0.3 eq | 0.3 eq |
| photo-initiator PI1173 | 0.15 g | 0.15 g | 0.15 g |
| acrylic monomer EM235 | 0.325 g (1 eq) | 0.325 g (1 eq) | 0.325 g (1 eq) |
| ethanol | 1 ml | 1 ml | 1 ml |
| inorganic oxide | silicon dioxide 0.12 g (with a particle size of 20 nm) | silicon dioxide 0.24 g (with a particle size of 20 nm) | titanium dioxide 0.12 g (with a particle size of 0.3 µm) |
| transmittance (400~700 nm) | 84% | 80% | 34% |
| glossiness (under 60° C.) | 61.7 | 48.6 | 87 |
| haze | 8.1 | 12.3 | 73 |

As shown in Table 3, when the coating compositions further included an acrylic monomer and an inorganic oxide, the obtained compositions were suitable for serving as flat paint, anti-glare paint, diffusion film material.

Example 25

2.04 g of functionalized soybean mixture (III) was mixed with 0.15 g of photo-initiator (manufactured and sold by Eternal Chemical Co, Ltd, with a trade no. PI1173), obtaining coating composition (XV). Next, the coating composition (XV) was blade coated on an acrylic substrate, and pre-baked at 100° C. for 5 min. After exposing to UV irradiation (365 nm, 1150 mJ/cm$^2$), the obtained film was subjected to dissolution, and adhesion tests, and the results are shown in Table 4.

Example 26

2.04 g of functionalized soybean mixture (VI) was mixed with 0.15 g of photo-initiator (manufactured and sold by Eternal Chemical Co, Ltd, with a trade no. PI1173), obtaining coating composition (XVI). Next, the coating composition (XVI) was blade coated on an acrylic substrate, and pre-baked at 100° C. for 5 min. After exposing to UV irradiation (365 nm, 1150 mJ/cm$^2$), the obtained film was subjected to dissolution, and adhesion tests, and the results are shown in Table 4.

Comparative Examples 1-3

0.2 eq, 0.5 eq, and 1.0 eq of methacrylic acid (manufactured by Aldrich) were respectively mixed with 1 eq of epoxidized soybean oil oligomer (manufactured by Chang Chun Plastics Co., LTD with a trade no. of 6261, wherein the epoxidized soybean oil did not include carboxylic group and PEO (poly(ethylene oxide)) chain), and 0.15 g of photo-initiator (manufactured and sold by Eternal Chemical Co, Ltd, with a trade no. PI1173), obtaining coating compositions (XVII)-(XIX). Next, the coating compositions (XVII)-(XIX) were blade coated respectively on an acrylic substrate, and pre-baked at 100° C. for 5 min. After exposing to UV irradiation (365 nm, 1150 mJ/cm$^2$), the obtained films were subjected to dissolution, and adhesion tests, and the results are shown in Table 4.

TABLE 4

| | Example | | Comparative Example | | |
|---|---|---|---|---|---|
| | 25 functionalized soybean mixture 3 2.04 g (1 eq) | 26 functionalized soybean mixture 6 2.04 g (1 eq) | 1 epoxidized soybean oil oligomer (1 eq) | 2 epoxidized soybean oil oligomer (1 eq) | 3 epoxidized soybean oil oligomer (1 eq) |
| equivalent of carboxylic group | 0.2 eq | 0.5 eq | — | — | — |
| methacrylic acid | — | — | 0.2 eq | 0.5 eq | 1 eq |
| photo-initiator PI1173 | 0.15 g | 0.15 g | 0.15 g | 0.15 g | 0.15 g |
| water-soluble | no | yes | no | no | yes |
| alkali-soluble (5 wt % NaOH aqueous solution) | yes | yes | no | no | yes |
| Adhesion test | pass | pass | non-pass | non-pass | non-pass |

As shown in Table 4, the films formed from the coating compositions (Comparative Examples 1-3), which were prepared from epoxidized soybean oil oligomer and methacrylic acid, and were water-soluble and alkali-soluble simultaneously, or water-insoluble and alkali-insoluble simultaneously. The films of Comparative Examples 1-3 cannot meet the requirement "insoluble in water, and removable by washing with alkaline solution".

The functionalized soybean compounds exemplary embodiment of the disclosure were prepared by subjecting the epoxidized soybean oil to a ring-opening reaction for introducing long-chain alkylene oxide moieties, carboxylic groups, and acrylic functional groups. The introduced long-chain alkylene oxide moieties can enhance the hydrophilicity of the functionalized soybean compounds and improve the adhesion between the substrate and the functionalized soybean compound. The introduced carboxylic groups can increase the alkali-solubility of the functionalized soybean compounds. The introduced acrylic functional groups can increase the photo-curability of the functionalized soybean compounds. Further, when the equivalent of carboxylic group of the coating composition including the functionalized soybean compounds was adjusted to a specific range (such as 0.3-0.5), the film formed from the aforementioned coating composition can be insoluble in water and removable by washing with alkaline solution. Therefore, the substrate, which is coated with the coating composition, can be reusable. Moreover, the coating compositions of the disclosure can further include an inorganic oxide, and the obtained compositions can be suitable for serving as flat paint, anti-glare paint, diffusion film material.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A functionalized soybean compound, represented by formula (I):

formula (I)

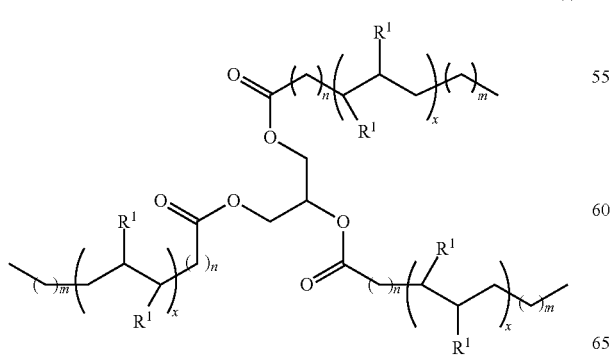

wherein, each n is independent and an integer from 1 to 10; each m is independent and an integer from 1 to 10; each x is independent and is 1 or 2; and each $R^1$ is independent and is hydroxyl group,

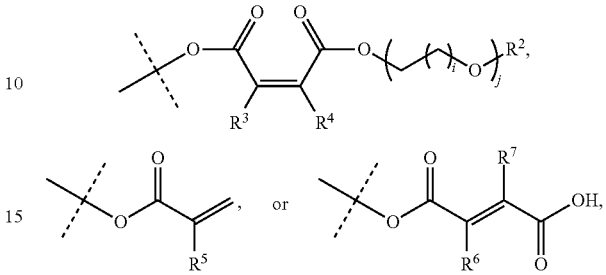

wherein i is 1, or 2; j is an integer from 4 to 60; $R^2$ is hydrogen, $C_{1-3}$ alkyl group, or acrylate group; $R^3$ and $R^4$ are hydrogen, or $R^3$ and $R^4$ are linked together with the carbon atoms to which $R^3$ and $R^4$ are attached to form a saturated and unsaturated six-membered ring; and $R^5$, $R^6$, and $R^7$ are independently hydrogen, or $C_{1-6}$ alkyl group, and wherein only one $R^1$ is

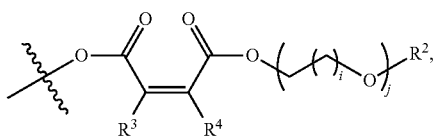

at least one $R^1$ is

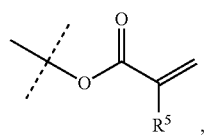

and at least one $R^1$ is

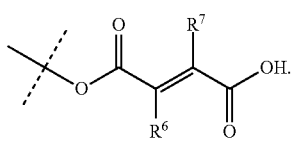

2. The functionalized soybean compound as claimed in claim 1, wherein only one $R^1$ is

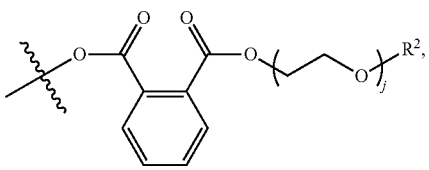

at least one $R^1$ is

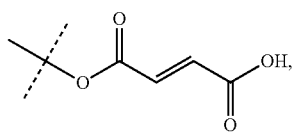

and the other $R^1$ are

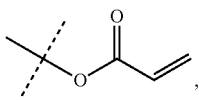, wherein $R^2$ is hydrogen, $C_{1-3}$ alkyl group, or acrylate group, j is an integer from 4 to 60.

3. The functionalized soybean compound as claimed in claim 1, wherein only one $R^1$ is

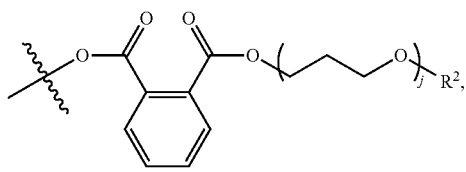

at least one $R^1$ is

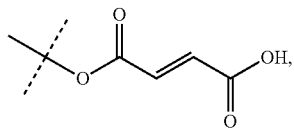

and the other $R^1$ are

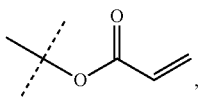, wherein $R^2$ is hydrogen, $C_{1-3}$ alkyl group, or acrylate group, j is an integer from 4 to 60.

4. The functionalized soybean compound as claimed in claim 1, wherein only one $R^1$ is

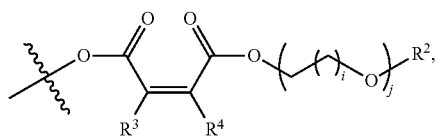

at least one $R^1$ is

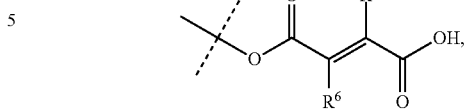

and the other $R^1$ are

, wherein i is 1, or 2; j is an integer from 4 to 60; $R^2$ is hydrogen, $C_{1-3}$ alkyl group, or acrylate group; $R^3$ and $R^4$ is hydrogen, $R^3$ and $R^4$ are linked together with the carbon atoms to which $R^3$ and $R^4$ are attached to form a saturated and unsaturated six-membered ring; and $R^5$, $R^6$, and $R^7$ are independently hydrogen, or $C_{1-6}$ alkyl group.

5. The functionalized soybean compound as claimed in claim 1, wherein $R^5$, $R^6$, and $R^7$ are independently hydrogen, methyl, ethyl, propyl, isopropyl, butyl, isobutyl, pentyl, or hexyl.

6. The functionalized soybean compound as claimed in claim 1, wherein $R^3$ and $R^4$ are linked together with the carbon atoms to which $R^3$ and $R^4$ are attached to form a phenyl group, or a pyridyl group.

7. A coating composition, comprising:
a photo-initiator; and
the functionalized soybean compound as claimed in claim 1.

8. The coating composition as claimed in claim 7, wherein the photo-initiator has a weight percentage of between 2-10 wt %, based on the weight of the functionalized soybean compound.

9. The coating composition as claimed in claim 7, further comprising acrylic monomer, wherein the acrylic monomer has at least two terminal acrylic functional groups.

10. The coating composition as claimed in claim 9, wherein the acrylic monomer has a weight percentage of between 0.01-30 wt %, based on the weight of the functionalized soybean compound.

11. The coating composition as claimed in claim 7, further comprising a colorant, wherein the colorant comprises dye or pigment.

12. The coating composition as claimed in claim 11, wherein the colorant has a weight percentage of between 0.01-100 wt %, based on the weight of the functionalized soybean compound.

13. The coating composition as claimed in claim 7, further comprising:
a functionalized soybean compound represented by formula (II) of:

formula (II)

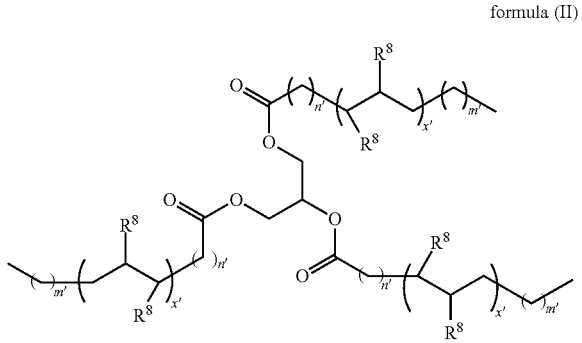

wherein, each n' is independent and an integer from 1 to 10; each m' is independent and an integer from 1 to 10; each x' is independent and is 1 or 2; and each $R^8$ is independent hydroxyl group,

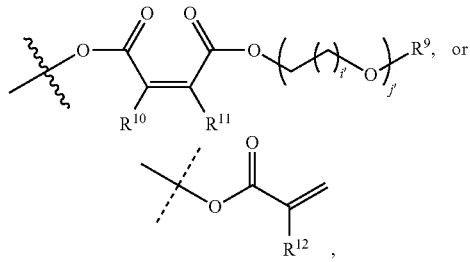

wherein i' is 1, or 2; j' is an integer from 4 to 60; $R^9$ is hydrogen, $C_{1-3}$ alkyl group, or acrylate group; $R^{10}$ and $R^{11}$ are hydrogen, or $R^{10}$ and $R^{11}$ are linked together with the carbon atoms to which $R^{10}$ and $R^{11}$ are attached to form a saturated and unsaturated six-membered ring; and $R^{12}$ is hydrogen, or $C_{1-6}$ alkyl group.

14. The coating composition as claimed in claim 13, wherein the molar ratio of the carboxylic group of the functionalized soybean compounds having Formula (I) and Formula (II) to the functionalized soybean compounds having Formula (I) and Formula (II) is of between 0.1-0.5.

15. The coating composition as claimed in claim 7, further comprising an inorganic oxide particle, wherein the inorganic oxide particle comprises titanium dioxide, or silicon dioxide.

16. The coating composition as claimed in claim 15, wherein the inorganic oxide particle has a particular size of between 0.01-1.0 μm.

17. The coating composition as claimed in claim 15, wherein the inorganic oxide particle has a weight percentage of between 2-40 wt %, based on the weight of the functionalized soybean compound.

18. A coating composition, comprising:
a photo-initiator;
an inorganic oxide particle; and
the functionalized soybean compound as claimed in claim 1.

19. The coating composition as claimed in claim 18, wherein the inorganic oxide particle comprises titanium dioxide, or silicon dioxide.

20. The coating composition as claimed in claim 18, wherein the inorganic oxide particle has a particular size of between 0.01-1.0 μm.

21. The coating composition as claimed in claim 18, wherein the photo-initiator has a weight percentage of between 2-10 wt %, and the inorganic oxide particle has a weight percentage of between 2-40 wt %, based on the weight of the functionalized soybean compound.

22. The coating composition as claimed in claim 18, further comprising an acrylic monomer, wherein the acrylic monomer has at least two terminal acrylic functional groups.

23. The coating composition as claimed in claim 18, wherein the acrylic monomer has a weight percentage of between 0.01-30 wt %, based on the weight of the functionalized soybean compound.

* * * * *